United States Patent [19]

Kotaka et al.

[11] Patent Number: 4,636,041
[45] Date of Patent: Jan. 13, 1987

[54] APERTURE DEVICE FOR ZOOM LENS

[75] Inventors: Yoshiro Kotaka; Hideshi Naito, both of Tokyo; Yoshiharu Shiokama, Kawasaki, all of Japan

[73] Assignee: Nippon Kogaku K. K., Tokyo, Japan

[21] Appl. No.: 675,309

[22] Filed: Nov. 27, 1984

[30] Foreign Application Priority Data

Nov. 30, 1983 [JP] Japan ................. 58-226341

[51] Int. Cl.$^4$ ............................. G02B 15/00
[52] U.S. Cl. .................... 350/429; 354/274
[58] Field of Search ............... 350/429; 354/274, 270

[56] References Cited

U.S. PATENT DOCUMENTS 4,141,636  2/1979  Shiniojima .............. 350/429
4,264,178  4/1981  Muryoi ................... 354/274
4,473,278  9/1984  Hana ...................... 350/429

*Primary Examiner*—John K. Corbin
*Assistant Examiner*—Loha Ben
*Attorney, Agent, or Firm*—Shapiro and Shapiro

[57] ABSTRACT

The aperture of a zoom lens is varied automatically during zooming by an aperture drive device that includes a pair of drive members rotatable about the optical axis. Each drive member has an arm member that engages a coupling member on a rocking member pivoted about an axis perpendicular to the optical axis. During an aperture closing operation the coupling member and the arm members move relatively along the optical axis. Initially, both drive members rotate together, such that the aperture does not change, but then the drive members rotate relatively to vary the aperture.

9 Claims, 5 Drawing Figures

APERTURE DEVICE FOR ZOOM LENS

BACKGROUND OF THE INVENTION

1. Field of the Invention

The present invention relates to an aperture apparatus for camera zoom lenses and particularly to a zoom lens aperture device having an open aperture diameter variable in operative association with zooming.

2. Description of the Prior Art

Many conventional zoom lenses include an aperture having its diameter variable in co-operation with zooming or focusing to compensate the change of effective beam diameter at various aperture positions such that F-value will be maintained constant.

U.S. Pat. No. 4,264,178, which was issued on Apr. 28, 1981, discloses one of this type of zoom lens in which an aperture being closed from its open aperture diameter may be controlled such that the aperture will be positioned exactly at a preset aperture value in any selected zooming position.

Such an aperture apparatus comprises first and second co-operating members located between a connection of the aperture with the camera and an aperture blade assembly, the first and second members being connected with each other in a transmitting portion, which is provided with a predetermined gap δ. The aperture apparatus further includes a first spring for biasing the first member in the direction in which the aperture blade is closed, and a second spring for biasing the second member in the direction in which the aperture blade is opened.

The movement of the first co-operative member under the influence of the first spring will thus be transmitted to the second co-operating member after the gap δ in the transmitting portion has been closed, so that the second member can be moved against the action of the second spring. The movement of the first member is stopped when the aperture being closed reaches a preset aperture value.

During the closing of the aperture, the second member and aperture blades have inertia due to which after the first co-operating member has already been stopped, the second co-operating member tends to be further moved in such a direction that the gap δ is again formed in the transmitting portion. Thus, the aperture blades will vibrate at the final closing step. Such a vibration retards the complete stoppage of the aperture blade assembly. Particularly, when the aperture diameter is to be controlled to smaller values, the above vibration will adversely affect the exposure condition.

SUMMARY OF THE INVENTION

It is therefore an object of the present invention to provide a zoom lens system comprising an aperture apparatus which can be controlled to be positioned exactly at a preset aperture value during closing of the aperture even if the open aperture diameter is variable depending on zooming positions.

Another object of the present invention is to provide an aperture apparatus which can be positioned precisely at the desired aperture value in less time when the aperture is to be closed.

DESCRIPTION OF PREFERRED EMBODIMENTS

Figure 1:
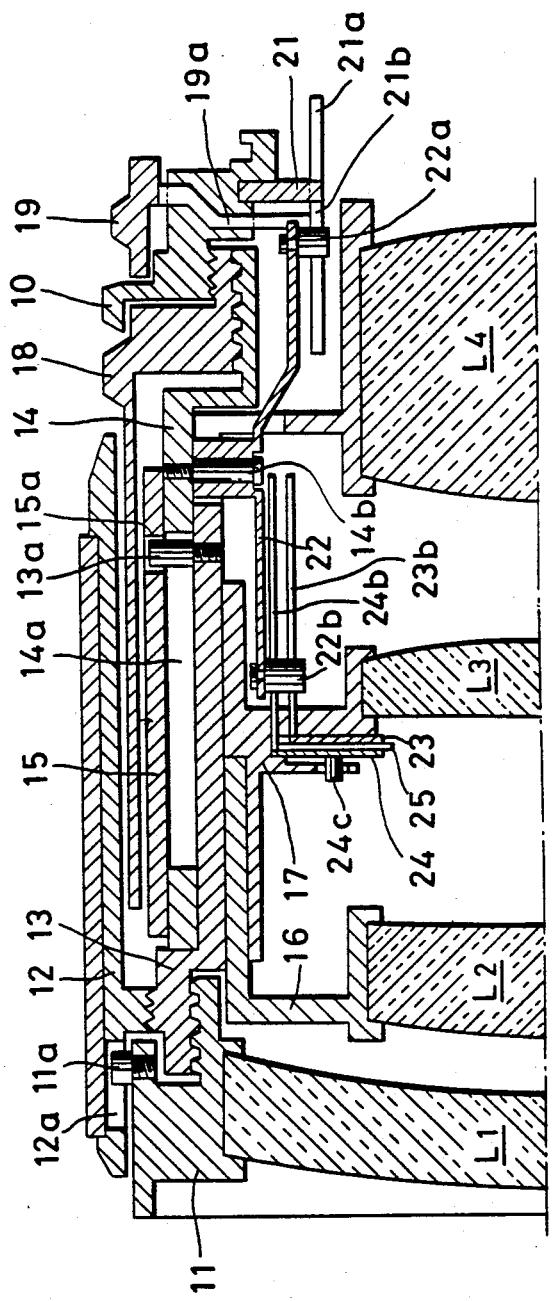
FIG. 1 is a cross-sectional view of a zoom lens system in accordance with a first embodiment of the present invention.

Referring now to FIG. 1, there is shown a zoom lens assembly comprising four lens groups L1 to L4. Upon focusing, the first, second and third lens groups are respectively moved while upon zooming, all the four lens groups are respectively moved. These lens groups are held in a lens barrel which in turn is to be connected with a camera through a fixing ring 10 having a mount to the camera.

The first lens group L1 is held by a retainer ring 11. An operation ring 12 includes a linear groove 12a extending along the optical axis of the zoom lens and being engaged by a pin 11a on the retainer ring 11 such that the retainer and operation rings 11 and 12 will not be rotated relative to each other. A slide ring 13 is screwed on both the retainer and operation rings 11 and 12 with one end holding the fourth lens group L4. A linear-motion ring 14 is disposed against rotation relative to the fixing ring 10 between the slide and operation rings 13, 12. The ring 14 rotatably supports a cam ring 15 including a spiral cam groove 15a. The slide ring 13 is provided with a pin 13a which engages the spiral cam groove 15a of the ring 15 through a linear groove 14a on the ring 14, which extends along the optical axis.

The second lens group L2 is held by a retainer ring 16 which is provided with a pin (not shown) engaging a linear groove (not shown) on the linear-motion ring 14 and a spiral cam groove (not shown) on the cam ring 15.

The third lens group L3 is held by a retainer ring 17 which is provided with a similar pin (not shown) engaging a linear groove (not shown) on the linear-motion ring 14 and a spiral cam groove (not shown) on the cam ring 15 as in the retainer ring 16.

The linear-motion ring 14 is screwed on a macro-ring 18 which can be rotated for effecting a focusing operation to the macro region. The macro-ring 18 is screwed on the fixing ring 10.

The linear-motion and fixing rings 14, 10 are connected with each other against relative rotation through a linear-motion key (not shown). Thus, the rotation of the macro-ring 18 causes the spacing between the linear-motion and fixing rings 14, 10 to change.

An aperture ring 19 is rotatably fitted on the fixing ring 10 and manually operated to select aperture values.

Figure 2:
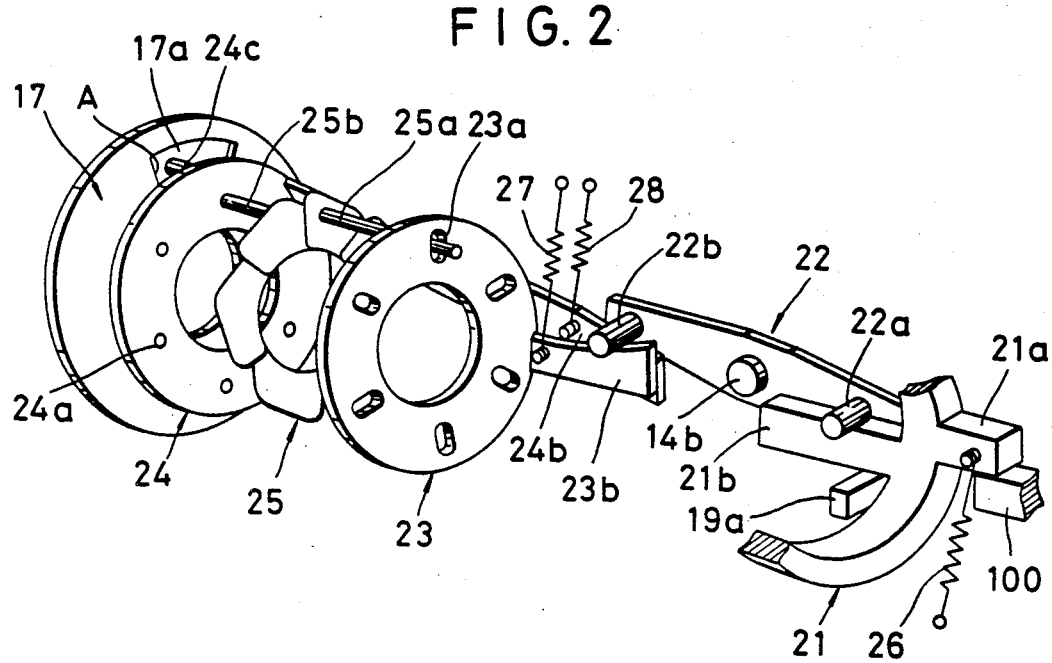
FIG. 2 is a perspective view of an aperture control mechanism shown in FIG. 1.

An aperture drive device comprises a ring member 21, a rocking member 22 and first and second ring-like drive members 23, 24. The ring member 21 is rotatably fitted into the fixing ring 10 and includes two engagement portions 21a and 21b extending along the optical axis. As shown in FIG. 2, one of the engagement portions 21a is engaged by an aperture transmission lever 100 provided on the camera side. The ring member 21 is biased by a spring 26 such that it follows the downward movement of the lever 100. The other engagement portion 21b is engageable with a stop 19a extending radially from the aperture ring 19. The stop 19a is adapted to stop the rotation of the ring member 21 at a position corresponding to an aperture value which is manually selected through the rotation of the aperture ring.

The rocking member 22 is pivotable about a shaft 14b on the linear-motion ring 14 with the opposite ends thereof being formed with pins 22a and 22b, respectively.

The first and second ring-like drive members 23, 24 are rotatable about the optical axis through the retainer ring 17. Aperture blades 25 are movably mounted between the drive members 23 and 24. The first drive member 23 is formed with a plurality of cam grooves 23a each receiving a pin 25a extending from the corresponding aperture blade 25. The second drive member 24 is provided with a plurality of holes 24a each receiving a pin 25b which functions as the pivotal center of the corresponding aperture blade 25.

Each of the drive members 23 and 24 is further formed with operating means constituted by an arm member (connection member) 23b or 24b extending along the optical axis. Each of the arm members 23b and 24b has a tapered surface formed thereon obliquely relative to the optical axis in directions opposite to each other. The tapered surfaces are engaged by a coupling member constituted by the pin 22b on a moving means constituted by the rocking member 22. The other pin 22a of the rocking member 22 engages the engagement portion 21b on the ring member 21. Each of the drive members 23 and 24 is biased by means of a spring 27 or 28, in such a direction that the corresponding tapered surface biases the pin 22b, that is, in the direction in which the above aperture blades 25 will be closed.

The second drive member 24 includes a pin 24c fixedly mounted thereon and extending along the optical axis. The pin 24c is received in a limitation opening 17a formed in the retainer ring 17.

When the illustrated lens barrel is mounted on the body of the camera, the aperture transmission lever 100 on the camera body will engage the engagement portion 21a of the ring member 21 which in turn is rotated counter-clockwise against the action of the spring 26. This rotation of the ring member 21 causes the rocking member 22 to rotate counter-clockwise so that the first and second drive members 23 and 24 will be rotated clockwise through the pin 22b to move the aperture blades toward their open position.

On focusing, the operation ring 12 is manually rotated about the optical axis. Since the pin 11a engages the groove 12a, the ring 11 will be moved leftward as viewed in FIG. 1 while rotating through helicoid-thread engagement between the rings 11 and 13. Thus, the lens L1 linearly moves to attain the focusing operation.

Zooming will be effected as follows: When the operation ring 12 is manually moved leftward as viewed in FIG. 1, from the wide-angle position of the lens illustrated in FIG. 1, the zoom lens will be shifted to the telephoto side. More particularly, the rings 11 and 13 will be moved together with the sliding motion of the operation ring 12. Thus, the pin 13a causes the cam ring 15 to rotate through a rotational angle which is provided by the cam groove 15a. As the cam ring 15 is rotated, the retainer rings 16 and 17, which include their pins engaging the cam grooves (not shown) on the cam ring 15 and the linear-motion grooves (not shown) on the linear-motion ring 14 as previously mentioned, are linearly moved with the lens groups L2 and L3 leftward as viewed in FIG. 1. The rings 14 and 18 remain stationary. Thus, the lens groups L1 to L4 are moved leftward as viewed in FIG. 1, such that a zooming position on the telephoto side will be obtained depending on the positions of the respective lens groups. During this zoom control operation, there is created a relative movement between the pin 22b and the two tapered surfaces 23b, 24b.

When the zoom lens system is zoomed to the telephoto side, the retainer ring 17 and member 22 are moved apart from each other such that the pin 22b will be positioned near the distal end of the arms 23b and 24b. If the zoom lens system is zoomed to the wide-angle side, the retainer ring 17 and member 22 are moved toward each other so that the pin 22b will be positioned near the proximal ends of the arms 23b and 24b. If the zoom lens system is zoomed from the telephoto side to the wide-angle side, the pin 22b is moved from the distal to the proximal ends of the arms 23b and 24b such that the first drive member 23 will be rotated counter-clockwise and the second drive member 24 will be rotated clockwise. Thus, the aperture diameter of the aperture blades 25, which has been in the open position, is decreased depending on the change of effective beam diameter which is created at that aperture position on zooming.

The rotation of the second drive member 24 due to zooming from telephoto to wide-angle side brings a change of the relative position of the pin 24c within the restrictive hole 17a of the retainer ring 17. The pin 24c is in contact with one of the radial edges A of the hole 17a in the telephoto position. As the zoom lens is moved toward the wide-angle position, the pin 24c is disengaged from that edge A of the hole 17a.

Figure 3:
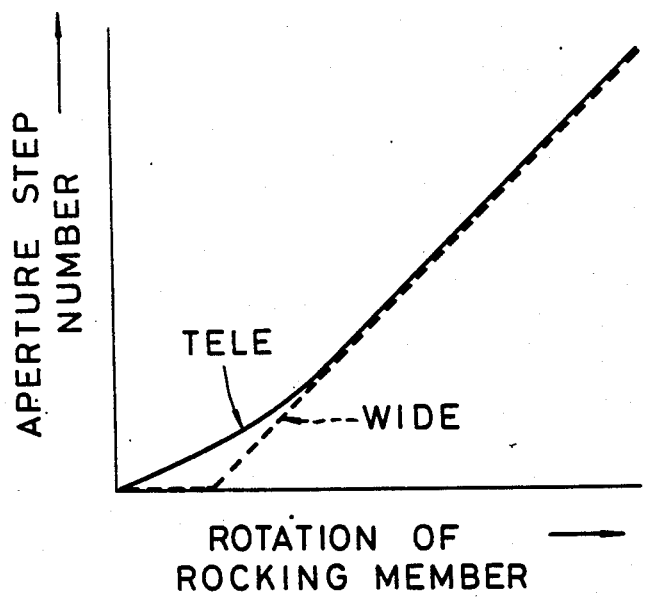
FIG. 3 is a graph showing the variable characteristic of aperture step number relative to the rotation of a rocking member.

Such an arrangement of the pin and hole (24c, 17a) functions in the same manner as the gap δ in the transmission portion disclosed in the aforementioned U.S. Pat. No. 4,264,178. Namely, as shown in FIG. 3, the characteristic of the aperture on the wide-angle side can be compensated to correspond to that on the telephoto side, depending on the relationship between the rotation of the rocking member 22 and the aperture step number.

If a photographing operation is initiated from the camera body side when the zoom lens is set at its wide-angle position, the aperture transmission lever 100 on the camera body is moved downwardly. If the camera body is set in the automatic aperture control mode, the movement of the lever 100 is one required to provide a predetermined aperture value to the zoom lens. Following the motion of the aperture transmission lever 100, the ring member 21 is rotated clockwise. The first and second drive members 23 and 24, which have been engaged by the rocking member 22, are then rotated counter-clockwise under the action of the springs 27 and 28. The first and second drive members 23 and 24 are rotated together until the pin 24c engages the radial edge A of the hole 17a. Accordingly, the aperture diameter remains open. When the pin 24c abuts the radial edge A of the hole 17a to stop the second drive member 24, only the first drive member 23 is further rotated under the influence of the spring 27 to move the aperture blades 25 into their closing position. This closing is accomplished as shown by the broken line in FIG. 3.

The rotation of the first drive member 23 is continued until the motion of the aperture transmission lever 100 is stopped to stop both the ring 21 and rocking member 22.

Immediately when the closing is completed, the inertial force in the first drive member 23 and the aperture blades 25 is totally absorbed by the aperture transmission lever 100 of the camera body through the arm 23b and rocking member 22. As a result, the pin 24c will not be moved away from the radial edge A of the hole 17a. In this manner, the motion of the aperture blades 25 can be stopped in a minimum time period.

In the manual exposure setting mode in which a photographing operation is carried out according to an aperture value preset by the aperture ring 19, and in the automatic shutter speed control mode, the lever 100 is moved to its lowermost position in which the aperture diameter becomes minimum. At this time, the function of the lever 100 is undertaken by the stop 19a of aperture ring 19.

Figure 4:
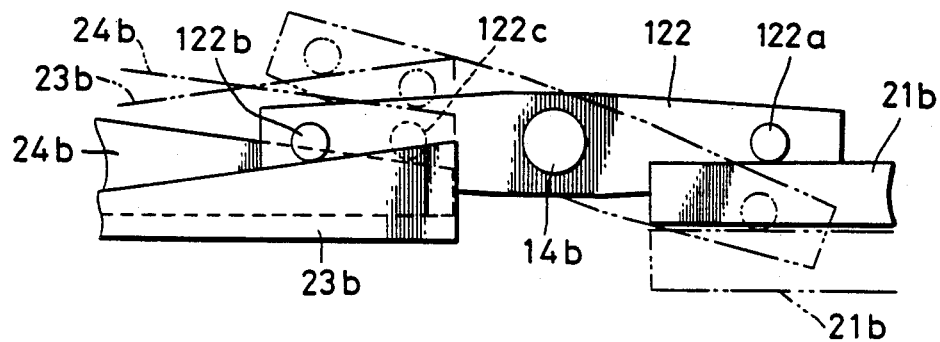
FIG. 4 is a front elevational view of an aperture control mechanism in accordance with a second embodiment of the present invention.

The control of aperture on the wide-angle side, which is compensated as shown in FIG. 3, may further be improved by the modified construction of a rocking member as shown in FIG. 4.

A rocking member 122 shown in FIG. 4 comprises two pins 122a and 122b similar to those of the rocking member 22 shown in FIG. 2 as well as a third pin 122c opposite to the pin 122b. The third pin 122c is located between the pin 122b and a shaft 14b.

The arms 23b, 24b of the first and second drive members 23, 24 are disposed on the opposite sides of the rocking member 122 such that the respective tapered surfaces thereof will be in contact with the coupling portions constituted by pins 122b and 122c, respectively.

When a photographing operation is initiated on the camera and if the engagement portion 21b of the ring member 21 is moved downwardly to a phantom-line position, the rocking member 122 will be rotated as shown by phantom line in FIG. 4.

The upward movement of the pin 122c associated with the rotation of the rocking member 122 is smaller than that of the pin 122b. If the zoom lens is shifted to the wide-angle side, therefore, the upward movement of the arm 24b always contacting the pin 122c will also be smaller than that of the arm 23b contacting the pin 122b. A difference of displacement between these shifted arms provides a relative displacement between the first and second drive members such that the aperture blades will be moved slightly at the beginning of the aperture closing operation.

Figure 5:
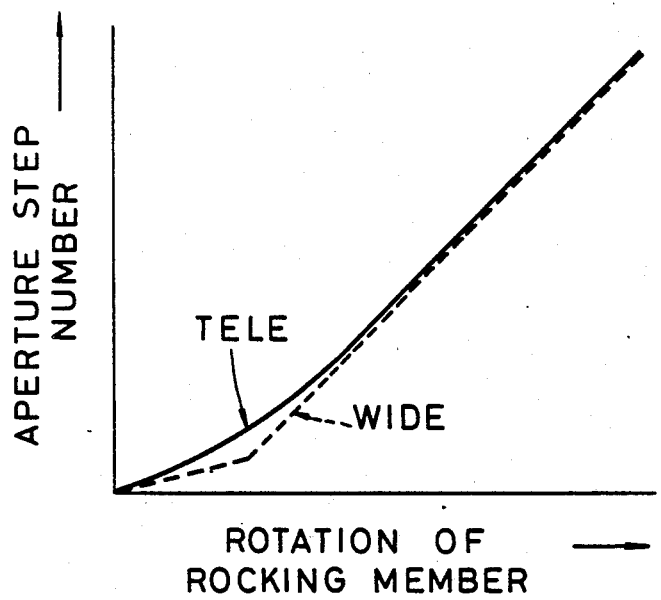
FIG. 5 is a graph showing the variable characteristic of aperture step number relative to a rocking member in the second embodiment.

This slight movement of the aperture blades provides, on the wide-angle side, such a characteristic of aperture control as shown in FIG. 5. It is found that the characteristic is so improved that the characteristic curve of the wide-angle side approaches that of the telephoto side more so than the characteristic shown in FIG. 3.

We claim:

1. An aperture apparatus for a zoom lens, comprising:
   aperture blade means forming an aperture opening;
   drive means connected with said aperture blade means, said drive means being operable to drive said aperture blade means to vary said aperture opening, and including first and second rotatable drive members that drive said aperture blade means to vary said aperture opening when there is relative rotation between said first and second drive members, the first and second drive members each being rotatable about the optical axis;
   moving means having a coupling member that is moved to perform an aperture closing operation;
   operating means for operating said drive means in response to movement of said coupling member, the operating means operating said drive means in such a manner that said aperture blade means is not driven while said coupling member is moved by a predetermined amount of movement after the start of said aperture closing operation and said aperture blade means is driven when said coupling member is moved in excess of said predetermined amount of movement, said operating means including first and second connection members operatively connected to said first and second drive members, respectively, and extending along said optical axis, the first and second connection members being coupled to said coupling member, and said first and second drive members each being rotated by the corresponding connection member during said aperture closing operation; and
   control means for controlling said operating means for varying said predetermined amount of movement in response to zooming.

2. An aperture apparatus for zoom lenses as defined in claim 1, wherein said operating means causes said first and second drive members to be rotated together about said optical axis after the start of said aperture closing operation and then causes said first and second drive members to be relatively rotated.

3. An aperture apparatus for zoom lenses as defined in claim 2, wherein said operating means has means for causing one of said first and second drive members to rotate within a limited range.

4. An aperture apparatus for zoom lenses as defined in claim 3, wherein said control means varies said limited range in response to said zooming.

5. An aperture apparatus for zoom lenses as defined in claim 1, wherein said moving means includes a rocking member which is provided with said coupling member at an end thereof that is displaced for said aperture closing operation.

6. An aperture apparatus for zoom lenses as defined in claim 5, wherein said rocking member has a rotation axis substantially perpendicular to said optical axis.

7. An aperture apparatus for zoom lenses as defined in claim 1, wherein said first and second connection members each has a surface in contact with said coupling member, the surface of one of said connection members sloping relative to the surface of the other.

8. An aperture apparatus for zoom lenses as defined in claim 7, wherein said control means includes means for relatively displacing said coupling member and each of said connection members in the direction of said optical axis.

9. An aperture apparatus for zoom lenses as defined in claim 11, wherein said moving means includes a rocking member having a rotational axis substantially perpendicular to said optical axis, and wherein said coupling member includes first and second coupling portions which are arranged at different distances from said rotational axis, said first coupling portion being coupled to said first connection member and said second coupling portion being coupled to said second connection member.

* * * * *